United States Patent [19]

Nagano

[11] Patent Number: 4,920,818
[45] Date of Patent: May 1, 1990

[54] SPEED CONTROL DEVICE FOR A BICYCLE

[75] Inventor: Masashi Nagano, Izumi, Japan

[73] Assignee: Shimano Industrial Company Limited, Osaka, Japan

[21] Appl. No.: 217,336

[22] Filed: Jul. 11, 1988

[30] Foreign Application Priority Data

Jul. 13, 1987 [JP] Japan .................. 62-107346[U]

[51] Int. Cl.⁵ .................. G05G 1/04; G05G 1/06
[52] U.S. Cl. .................. 74/475; 74/523; 74/502.2; 74/527; 74/531
[58] Field of Search ........... 74/475, 489, 523, 502.2, 74/527, 531; 464/36

[56] References Cited

U.S. PATENT DOCUMENTS

| | | | |
|---|---|---|---|
| 1,683,715 | 8/1924 | Erban | 464/36 X |
| 4,267,744 | 5/1981 | Yamasaki | 74/489 X |
| 4,699,018 | 10/1987 | Tagawa | 74/475 |
| 4,744,265 | 5/1988 | Nagano | 74/523 |
| 4,751,850 | 5/1988 | Nagano | 74/489 X |
| 4,751,852 | 6/1988 | Nagano | 74/523 |

FOREIGN PATENT DOCUMENTS 745147 2/1944 Fed. Rep. of Germany ........ 464/36

Primary Examiner—Gary L. Smith
Assistant Examiner—F. Saether
Attorney, Agent, or Firm—Stevens, Davis, Miller & Mosher

[57] ABSTRACT

A speed control device for a bicycle is provided, which includes a positioning mechanism comprising a positioning member having a plurality of engaging portions, an engaging member selectively engageable one at a time with the engaging portions and an elastic member for biasing the engaging member toward the engaging portions. A reaction force of the elastic member affects the torque of the operating lever to generate a clicking vibration felt by the cyclist. The speed control device includes a thrust bearing which, when the operating lever is operated and the engaging member disengages from one of the engaging portions and transfers to the adjacent engaging portion, bears the reaction force of the elastic member, thereby reducing the torque of the operating lever and amplifying the clicking vibration thereof.

6 Claims, 2 Drawing Sheets

SPEED CONTROL DEVICE FOR A BICYCLE

FIELD OF THE INVENTION

The present invention relates to a speed control device for a bicycle, and more particularly, to a speed control device for a bicycle, in which an operating lever is rotatably supported to a fixing member fixed to the bicycle frame so that the lever is rotated to actuate a derailleur mounted on the bicycle to thereby change the bicycle speed at a desired speed change stage.

BACKGROUND OF THE INVENTION

The conventional speed control device for the bicycle, in which the operating lever is rotatably supported to the fixing member to actuate the derailleur, is, in a well-known manner, provided with a positioning mechanism comprising (1) a positioning member having a plurality of engaging portions and mounted to one of the fixing member and the operating lever, (2) an engaging member mounted to the other of the fixing member and the operating lever and selectively engageable with one of the engaging portions, and (3) a spring biasing the engaging member toward the positioning member and maintaining engagement of the engaging member with the selected one of the engaging portions.

The spring has a spring force providing an engaging resistance sufficient to overcome a return spring at the derailleur in the condition in which the engaging member engages with one engaging portion, thereby maintaining the engaging condition and keeping the operating lever at one speed change stage. In other words, a reaction force of the spring acts on a torque of the operating lever to give thereto a rotational resistance, so that the operating lever, even when intended to turn, is maintained at a desired speed change stage because of overcoming the spring force.

Accordingly, when the operating lever is operated, the reaction force of the spring affects the torque of the operating lever, thereby allowing a cyclist to experience a clicking feel when operating the operating lever.

When the operating lever is operated, the engaging member disengages from the engaging portion and transfer to the adjacent one, with the torque changing as follows: The torque rises straight from a minimum to a maximum until the engaging member disengages from one engaging portion and falls to a medium value from the maximum value after the disengagement. Thereafter, the engaging member engages therewith to reduce the torque to a minimum value.

In the conventional speed control device, during the aforesaid switching of the engaging member, the reaction force of the spring biases the operating lever to the fixing member to apply a resistance against rotation of the lever, whereby the torque of the lever becomes larger than the medium value. At this time, the torque decreases from the maximum value to the minimum value through the aforesaid larger medium value, thereby reducing the rates of decrement from the maximum value to the medium value and to the minimum value.

As a result, a problem arises in that the cyclist, when operating the lever, experiences a poor clicking feel and cannot perform a brisk speed control operation.

SUMMARY OF THE INVENTION

An object of the invention is to provide a speed control device which can greatly reduce a torque of an operating lever from the maximum value when an engaging member at the lever disengages from one engaging portion and transfers to the adjacent one, thereby allowing the cyclist to perform a brisk speed control with an amplified clicking feel.

The present invention is characterized in that the speed control device for a bicycle is provided with a positioning mechanism comprising a positioning member having a plurality of engaging portions, an engaging member selectively engageable with one of the engaging portions, and an elastic member for biasing the engaging member toward the engaging portions. A reaction force of the elastic member affects the torque of the operating lever to provide a clicking feel to the cyclist operating the lever. The speed control device is provided with torque reduction means for reducing the torque of the lever when operated to disengage the engaging member from one engaging portion and transfer it to the adjacent one, thereby amplifying the clicking feel when the lever is operated.

The torque of the operating lever rises sharply from a minimum value to a maximum value until the engaging member disengages from one engaging portion. The torque of the operating lever is reduced by the torque reduction means from the maximum value when the engaging member having disengaged from one engaging portion transfers to the adjacent one, thereby enabling the clicking feel to be amplified and a brisk speed control operation to be performed.

The positioning member and engaging member at the speed control device of the invention are disposed opposite to each other axially of a lever shaft. The elastic member is constructed to apply its biasing force to the engaging member axially of the lever shaft. The torque reduction means is formed preferably of a thrust bearing to bear a reaction force of the elastic member.

One of the positioning member and the engaging member is supported to a fixing member and the other is supported to the operating lever, but it is preferable to support the positioning member thereto. Accordingly, the thrust bearing may be interposed between the operating lever and the fixing member, but preferably between the positioning member and the fixing member.

Also, the operating lever may be provided with a rotary member rotatable together therewith, and the positioning member may be provided at the rotary member. Also, the thrust bearing may be provided between the rotary member and the fixing member.

In each embodiment, the reaction force of the elastic member, when the engaging member disengages from one engaging portion and transfers to the adjacent one by operation of the operating lever, increases to a maximum, thereby biasing the operating lever toward the fixing member to apply a resistance against rotation of the lever and increasing the torque thereof to that extent. As a result, the thrust bearing bears a thrust load caused by the reaction force and acting on the operating lever or the positioning member and rotary member rotatable together with the lever, thereby enabling the resistance applied against the rotation of the lever to be minimized. Hence, an increase in the torque is largely restricted, so that the torque of the operating lever when the engaging member disengages from one engaging portion and transfers to the adjacent one, is greatly reduced with respect to that when the engaging member disengages from the one engaging portion. In other words, the rate of decrement in torque with respect to the maximum value can be enlarged, thereby increasing the clicking feel to that extent when the lever is operated.

The above and further objects and novel features of the invention will be more fully apparent from the following detailed description when the same is read in connection with the accompany drawings.

DETAILED DESCRIPTION OF THE PREFERRED EMBODIMENT

Figure 1:
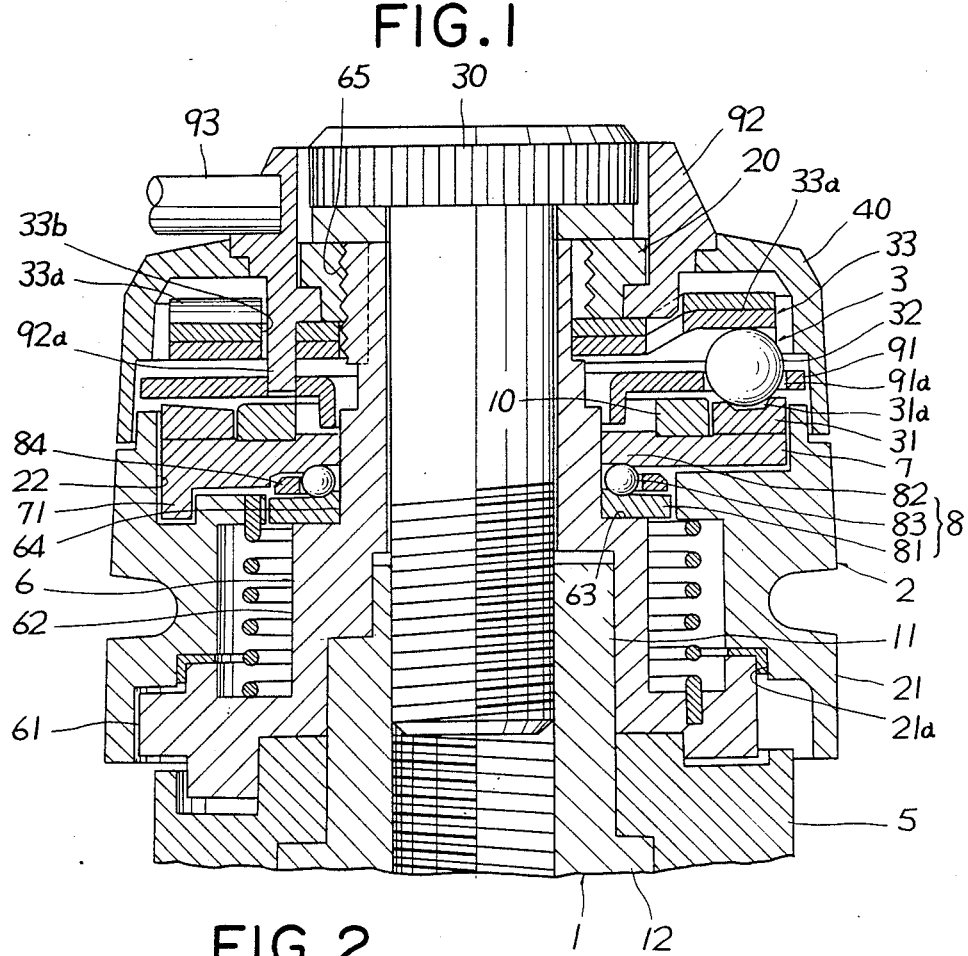
FIG. 1 is an enlarged sectional view of an embodiment of a speed control device for a bicycle of the invention, FIG. 2 an enlarged sectional view showing the relationship between a positioning member and an engaging member at a positioning mechanism.
Figure 2:
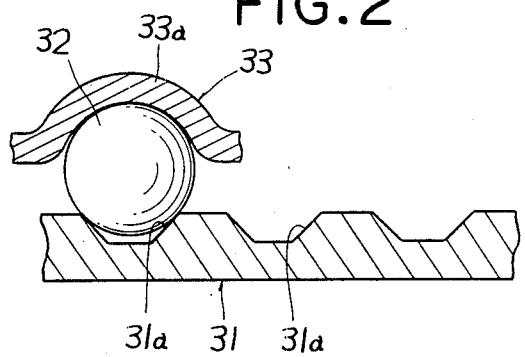
Figure 3:
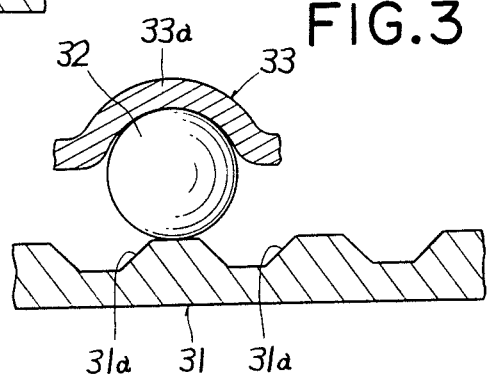
FIG. 3 is an enlarged sectional view showing the condition in which the engaging member at the position shown in FIG. 2 transfers to the adjacent engaging portion, corresponding to FIG. 2.

A bicycle speed control device shown in FIG. 1 is provided with a fixing member 1 having a tubular shaft 11; an operating lever 2 rotatably supported thereto; and a positioning mechanism 3. Positioning mechanism 3 comprises a positioning member 31 having a plurality of engaging portions 31a, an engaging member 32 selectively engageable with one engaging portion 31a, and an elastic member 33 biasing engaging member 32 toward the respective engaging portions 31a so as to apply to engaging member 32 an engaging resistance overcoming a spring force of a return spring at a derailleur. Each engaging portion 31a and the engaging member 32 are disposed opposite to each other axially of tubular shaft 11 so that a reaction force of elastic member 33 affects the torque of lever 2, thereby applying a clicking feel to a cyclist when operating lever 2.

Fixing member 1 comprises a base 12 welded to the bicycle frame and tubular shaft 11 projecting outwardly from one side of base 12. Base 12 non-rotatably supports a tubular adapter 5, and tubular shaft 11 is provided at its inner periphery with a screw thread. A fixing bush is fitted onto tubular shaft 11 to be non-rotatable relative to shaft 11. Fixing bush 6 is disposed around shaft 11 at its inner periphery as shown. Fixing bush 6 comprises a lever shaft 61 supporting operating lever 2, a larger diameter shaft portion 62 in continuation of lever shaft 61 through a stepped portion, a medium diameter shaft portion 64 in continuation of larger diameter shaft portion 62 through a stepped portion 63, and a threaded portion 65 in continuation of medium diameter shaft portion 64 and having at its outer periphery splines extending axially of bush 6.

Figure 4:
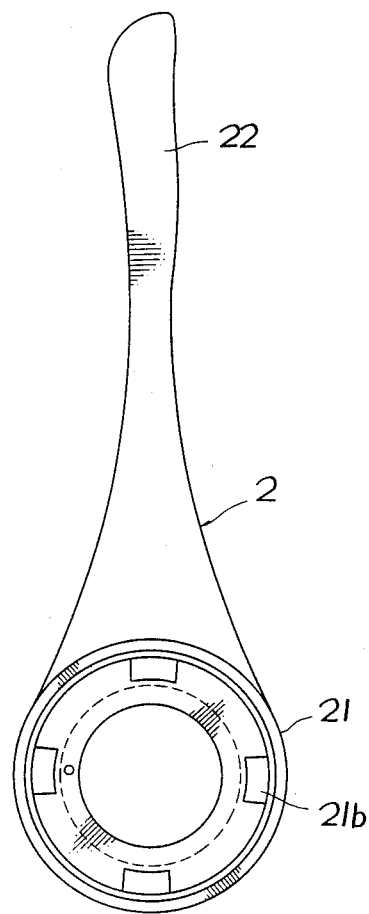
FIG. 4 is a plan view of an operating lever.

Lever 2, as shown in FIG. 4, comprises a cylindrical boss 21 having a through bore, and a control portion 22 extending radially outwardly from one side of boss 21. At the opening of one axial and of the through bore is provided a fitting portion 21a fitted onto lever shaft 61, and at the inner periphery of boss 21 are provided a plurality of recesses 21b engageable with a rotary member 7 to be discussed in detail below. In addition, a ratio of the distance $l_2$ between the rotation axis of lever 2 and the engaging position of engaging member 32 with each engaging portion 31a and the distance $l_1$ between the rotation axis of lever 2 and the utmost end of control portion 22 at lever 2 is 1:5.5.

Figure 5:
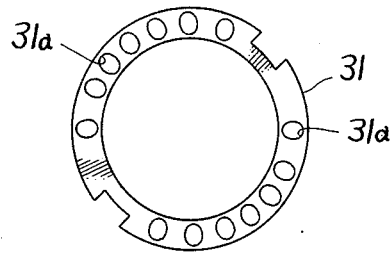
FIG. 5 is a plan view of the positioning member.

Positioning member 31 at positioning mechanism 3, as shown in FIG. 5, comprises an annular plate having at its center a through bore and is provided at its upper surface with a plurality of engaging portions 31a circumferentially spaced from each other at predetermined intervals. In addition, engaging portions 31a are recessed in the plate forming positioning member 31 but may be through bores.

Positioning member 31 in the FIG. 1 embodiment is fixed to the outer peripheral portion at the upper surface of the disc-like rotary member 7 which has a fitting bore into which medium diameter shaft portion 64 at bush 6 is inserted, such that positioning member 31 is rotatably supported relative to bush 6 through rotary member 7.

Figure 6:
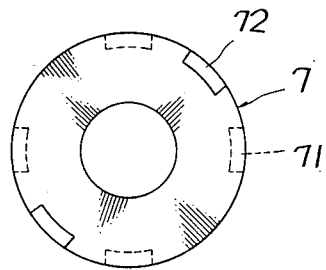
FIG. 6 is a plan view of a rotary member.

Rotary member 7, as shown in FIG. 6, is provided at the outer peripheral portion of its lower surface with a plurality of first engaging portions 71 circumferentially spaced at predetermined intervals and at the outer peripheral portion of its upper surface with a plurality of second engaging projections 72 for retaining positioning member 31. First engaging projections 71 engage with engaging recesses 21b provided at boss 21 of lever 2, so that rotary member 7 rotates together with lever 2. In addition, preferably between each first engaging portion 71 and each engaging recess 21b at rotary member 7 is provided a gap to allow rotation of lever 2 in a predetermined range with respect to positioning member 31, so that lever 2, when turned forwardly, is returned corresponding to an amount of over-shift, thereby freely returning lever 2 only by an amount of forward turn corresponding to the gap with respect to positioning member 31.

Also, in the illustrated embodiment, engaging member 32 is in the form of a ball, but may alternatively be a roller.

Elastic member 33 for biasing engaging member 32 comprises a disc-like leaf spring having a bore non-rotatably fitted on threaded portion 65 at bush 6. A recessed holding portion 33a having a radial thickness is provided at the engaging portion of elastic member 33 with engaging member 32, thereby preventing engaging member 32 from rotating together with positioning member 31.

The embodiment shown in the drawing is provided between rotary member 7 and bush 6 with a torque reducing means which reduces the torque of lever 2 and amplifies the clicking feel when lever 2 is operated and engaging member 32 disengages from one engaging portion 31a to transfer to the adjacent engaging portion.

The torque reducing means constitutes a thrust bearing 8 comprising a ball race 81, a ball holder 82, and a large number of balls 83 interposed therebetween. Ball race 81 is fitted onto medium diameter shaft portion 64 to be non-rotatable relative to stepped portion 63, and ball holder 82 is integral with rotary member 7, so that the reaction force of elastic member 33 is received by thrust bearing 8 through engaging member 32 and positioning member 31. Hence, the torque of lever 2 is adapted to decrease down to a value of 30% or less with respect to the maximum. In addition, thrust bearing 8 may use a metal bearing other a ball bearing. In an embodiment employing a metal bearing, the contact surface thereof with rotary member 7 may be sharpened to bring the bearing into line contact therewith, but this element is not particularly limited in structure.

Preferably, elastic member 33 increases in its elastic force only to an extent of decrement by the torque reduction means so as to raise the engaging resistance of engaging member 32 to engaging portion 31a, corresponding to a spring force of the return spring at the derailleur.

Figure 7:
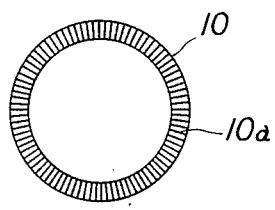
FIG. 7 is a plan view of a friction member.

Also, the embodiment of the speed control device of the invention shown in the drawings is provided with (1) a friction mechanism other than the positioning mechanism, which applies to operating lever 2 a frictional resistance overcoming the derailleur return spring in order to maintain lever 2 in a desired speed change stage against the force of the return spring at the derailleur and (2) a change-over mechanism alternatively selecting the positioning mechanism or the friction mechanism. The friction mechanism comprises a friction member 10, which, as shown in FIG. 7, has a friction portion 10a comprising a large number of minute ridges and circumferentially disposed on the outer periphery of an annular plate having at its center a through bore, with friction member 10 being fixed to positioning member 31 at a radially inward position thereof as shown.

Holding portion 33a of elastic member 33 has a semicylindrically-shaped section so as to allow engaging member 32 to move radially of positioning member 31. Elastic member 33 is provided at a radially intermediate portion with an escape bore 33b extending circumferentially of elastic member 33.

Figure 8:
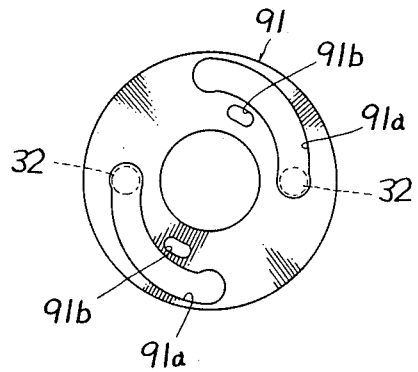
FIG. 8 is a plan view of a guide member.

The change-over mechanism comprises a guide member 91 having guides 91a which engage with engaging member 32 and shift it along holding portion 33a and a control member 92 for controlling guide member 91. Guide member 91, as shown in FIG. 8, comprises an annular plate having guides 91a circumferentially extending from portions opposite to engaging member 32 and engaging bores 91b into which transmitting arms 92a of control member 92 enter respectively. Guide member 91 is supported at the center rotatably to medium diameter shaft portion 64.

Control member 92 is rotatably supported to a support cylinder 20 screwable with threaded portion 65 at bush 6, and provided with transmitting arms 92a projecting from control member 92 and engageable with engaging bores 91b, so that the rotation of control member 92 is transmitted to guide member 91.

In addition, in FIG. 1, there is provided a retainer 84 for thrust bearing 8, a mounting screw bolt 30 screwable with the screw thread at tubular shaft 11, a handle 93 of a substantially C-shape provided at control member 92 in a freely rising and following manner, and a cover 40 of synthetic resin covering the positioning mechanism, friction mechanism and guide member 91 at the change-over mechanism.

In the speed control device of the invention constructed as described above, when positioning mechanism 3 is selected, engaging member 32 engages with any one of engaging portions 31a as shown in FIG. 1. In this condition, operating lever 2, when turned forwardly, freely rotates only by an amount of the gap between engaging portion 71 and engaging recess 21b with respect to positioning member 31 against the return spring at the derailleur and thereafter engaging projection 71 engages with engaging recess 21b, whereby operating lever 2 is integral with rotary member 7 and in turn positioning member 31.

Figure 9:
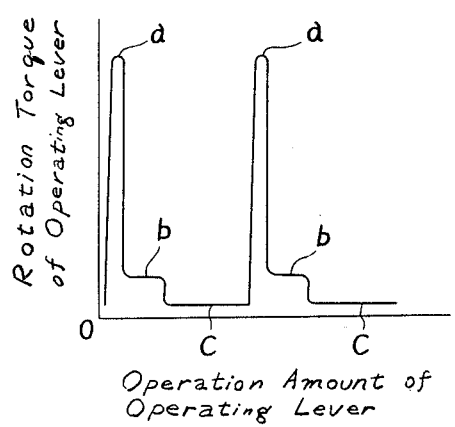
FIG. 9 is a graph of the torque of the operating lever as a function of its operation amount or extent.

In such condition, when lever 2 is turned further forwardly, positioning member 31 rotates together with lever 2 with respect to engaging member 32. When positioning member 31 rotates, a resistance is generated for allowing engaging member 32 to ride over one engaging portion 31a, and the reaction of elastic member 33 increases and acts on positioning member 31 and operating lever 2. Hence, the torque of lever 2 changes greatly as shown in FIG. 9.

In other words, when lever 2 is operated to disengage engaging member 32 from one engaging portion 31a, the resistance to ride engaging member 32 on engaging portion 31a and the increased reaction force of elastic member 33 allows the torque of lever 2 to abruptly rise from a minimum value to a maximum value.

The reaction force of elastic member 33, when engaging member 32 disengages from one engaging portion 31a, increases to a maximum, so that even when lever 2 is further operated, elastic member 33 never deflects. Accordingly, in this case, lever 2 is operated only against the reaction force of the elastically deformed elastic member 33.

In a case where engaging member 32 disengages from one engaging portion 31a and transfers to the adjacent engaging portion, the reaction force of elastic member 33 increases to a maximum, thereby being transmitted to boss 21 of lever 2 through positioning member 31 and rotary member 7, with the result that boss 21 of lever 2 is biased to fixing member 1 and in turn bush 6, thereby applying resistance against rotation of lever 2. As a result, the torque of lever 2 is not so greatly reduced in comparison with that when engaging member 32 rides on engaging portion 31a, but the present invention is provided with the torque reduction means: i.e., thrust bearing 8, in the illustrated embodiment. Hence, thrust bearing 8 bears the thrust load caused by the reaction force of elastic member 33, and the rotational resistance of lever 2, even when the reaction of elastic member 33 increases, does not increase proportionally to the reaction force.

Accordingly, after engaging member 32 rides on engaging portion 31a, the influence of elastic member 33 is minimized by the function of elastic member 33, so that the torque, as shown in FIG. 9, falls straight from the maximum value to the medium value b.

When engaging member 32 having disengaged from engaging portion 31a transfers to engage the adjacent engaging portion, the torque of lever 2 decreases to a minimum c as shown in FIG. 9. Although a difference between the minimum value c and the medium value b decreases, the medium value b is largely reducible with respect to the maximum value a, thereby amplifying the clicking feel of the cyclist when operating lever 2 and a brisk speed control is made possible. Incidentally, according to opinion polls of cyclists, users report that the clicking feel is dull when the percentage of the medium value of the torque with respect to the maximum is larger than 30% but when it is less than 30%, a brisk or sharp clicking feel is obtained.

Operating lever 2 is over-turned by the amount of the above-noted gap to over-shift a chain guide at the derailleur with respect to each sprocket so that a driving chain is guided and shifted to the desired sprocket.

Lever 2, when released, returns according to the amount of the gap by the return spring with respect to positioning member 31 and is maintained in position thereby. Also, the chain guide returns corresponding thereto and stops at the proper positions with respect to the sprocket.

In order to operate the friction mechanism, control member 92 in FIG. 1 is rotated in one direction so as to transmit its torque to guide member 91 through transmitting arms 92a. Guide member 91 rotates together with control member 92, and engaging member 32 shifts along guide 91a and radially inwardly of positioning member 31 and disengages from engaging portion 31a. On the other hand, engaging member 32 engages with friction portion 10a at friction member 10, thereby applying a frictional resistance against the return spring to lever 2 through the friction member.

When the friction mode, in which lever 2 is subjected to the predetermined resistance, is switched to the mode of operating positioning mechanism 3, the control member is rotated reversely, whereby engaging member 32 shifts radially outwardly of positioning member 31 along guide portion 91a and disengages from friction member 10 so as to engage with any one of engaging portions 31a.

In addition, the gap between rotary member 7 and lever 2 in the above embodiment is not indispensable. When no gap is provided, thrust bearing 8 may alternatively be provided between rotary member 7 or positioning member 31 and fixing member 1 including bush 6, or between lever 2 and fixing member 1.

Alternatively, positioning member 31 at positioning mechanism 3 may be fixed to bush 6 and engaging member 32 may operate together with lever 2 reversely to the above embodiment. Also, engaging member 32 may be a roller or a ridge provided at one side of a plate member. Elastic member 33 may use an elastic material, such as a coil spring, as an alternative to a leaf spring. Thus, positioning mechanism 3 is not particularly limited.

As seen from the above, the bicycle speed control device of the invention is provided with fixing member 1, operating lever 2 rotatably supported thereto, and positioning mechanism 3 comprising engaging member 32; elastic member 33, and positioning member 31 having engaging portions 31a so that the reaction force thereof affects the torque of lever 2 to give a clicking feel, and is also provided with the torque reduction means as described above. Hence, the torque of lever 2, when engaging member 32 after disengaging from engaging portion 31a transfers to the adjacent engaging portion, is largely reducible in comparison with a maximum value of the torque when the same disengages from the engaging portion, whereby a speed control device can be provided which increases the clicking feel when the lever is operated and performs brisk speed control.

While an embodiment of the invention has been shown and described, the invention is not limited to the specific construction thereof, which is merely exemplary in the specification rather than defined.

I claim:

1. A speed control device for a bicycle, comprising:
   a fixing member including a lever shaft;
   an operating lever supported to rotate relative to said lever shaft;
   a positioning mechanism for setting the speed change stage by said operating lever, said positioning mechanism comprising (i) a positioning member having a plurality of engaging portions and supported to one of said fixing member and said operating lever, (ii) an engaging member supported to the other of said fixing member and said operating lever and selectively engageable one at a time with said engaging portions, said positioning member and said engaging member being disposed adjacent one another axially of said lever shaft, and (iii) an elastic member for biasing one of said positioning member and said engaging member axially of said lever shaft and toward the other of said positioning member and said engaging member and for providing a clicking feeling to a cyclist on operation of said operating lever;
   engagement means for causing said operating lever and said one of said positioning member and said engaging member to rotate together, said engagement means comprising means for allowing said operating lever to rotate with respect to said one of said positioning member and said engaging member in a predetermined range; and
   a thrust bearing means provided between said fixing member and said one of said positioning member and said engaging member, for bearing a reaction force of said elastic member, for preventing said reaction force of said elastic member from acting on said operating lever when said operating lever rotates with respect to said one of said positioning member and said engaging member in said predetermined range and for reducing a rotational torque of said operating lever in response to said engaging member disengaging from one of said engaging portions and transferring to the adjacent engaging portion, so that said clicking feeling is amplified.

2. A speed control device as in claim 1 wherein said engagement means comprises a gap provided between said operating lever and said one of said positioning member and said engaging member.

3. A speed control device for a bicycle according to claim 1 further comprising a rotary member rotatable together with said operating lever, said rotary member being provided at a surface thereof facing in a direction axially of said lever shaft with one of said engaging member and said positioning member, said thrust bearing means being interposed between said rotary member and said fixing member.

4. A speed control device for a bicycle according to claim 1, further comprising:
   (a) a friction mechanism for applying a frictional resistance against rotation of said operating lever, and
   (b) a change-over mechanism for alternatively selecting said positioning mechanism and said friction mechanism.

5. A speed control device for a bicycle according to claim 4, wherein said positioning member is held to said operating lever, said engaging member being held to said fixing member, said positioning member and said engaging member being disposed opposite to each other axially of said lever shaft, said friction mechanism including friction portions disposed radially inwardly of said lever shaft with respect to said positioning member, and said change-over mechanism comprises (i) a guide member which guides said engaging member from a position where said engaging member is opposite to one of said engaging portions at said positioning member to a position where said engaging member is opposite to said friction portions to thereby alternatively select said positioning mechanism and said friction mechanism and (ii) a control member for controlling said guide member.

6. A speed control device for a bicycle according to claim 5, further comprising a rotary member rotatable together with said operating lever, said positioning member and said friction mechanism being disposed at a surface of said rotary member facing in a direction axially of said lever shaft and opposite to said engaging member, said positioning member and said friction portions being spaced apart radially inwardly and outwardly of said rotary member respectively, said thrust bearing means being interposed between said rotary member and said fixing member.

* * * * *